(No Model.)
R. H. T. NESBITT.
PRESCRIPTION FILE.
No. 303,313. Patented Aug. 12, 1884.
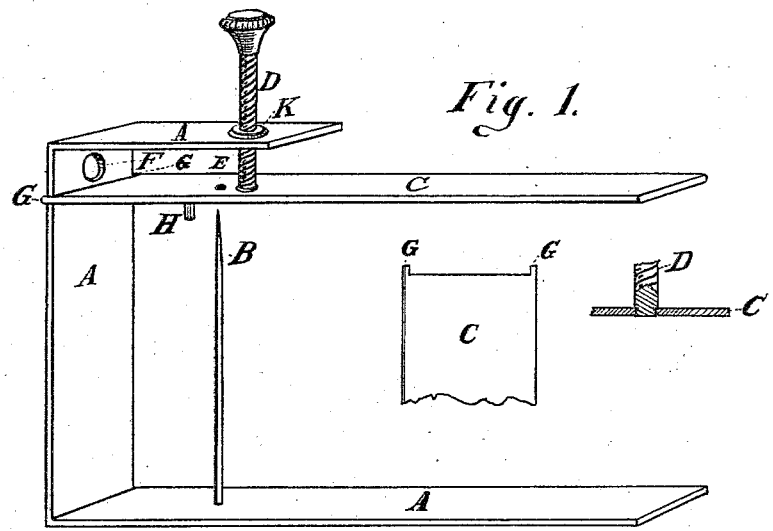
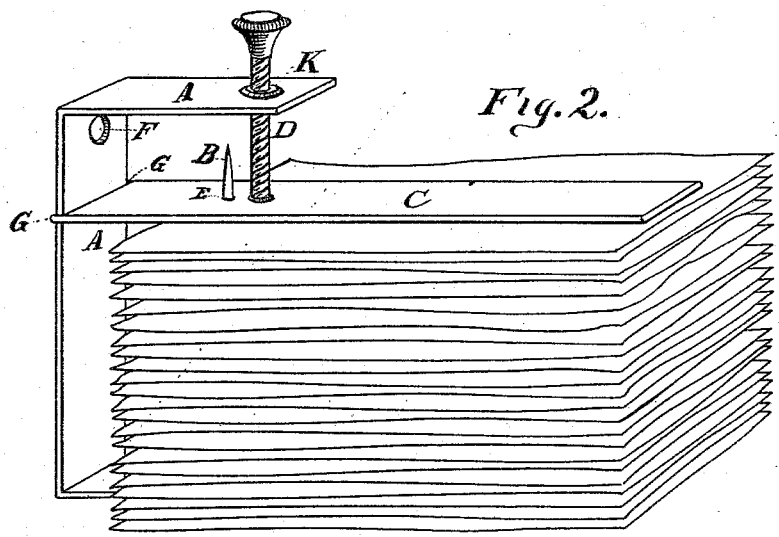
Witnesses.
Robert H. T. Nesbitt  Inventor.

UNITED STATES PATENT OFFICE.

ROBERT H. T. NESBITT, OF LEAVENWORTH, KANSAS.

PRESCRIPTION-FILE.

SPECIFICATION forming part of Letters Patent No. 303,313, dated August 12, 1884.

Application filed March 27, 1884. (No model.)

*To all whom it may concern:*

Be it known that I, ROBERT H. T. NESBITT, of the city of Leavenworth, in the county of Leavenworth and State of Kansas, have invented a new and useful Permanent Prescription-File, which is fully set forth in the following specification and accompanying drawings, in which—

Figure 1 is a representation of the invention. A A A is a metallic frame, about an inch or more in width; B, a metal rod, pointed, securely fastened, or riveted to the base of A A A, upon which the prescriptions are filed. C represents a movable binding-bar, of metal, a trifle wider than the frame, so as to permit of the notch (indicated by G G) at the end of the bar touching the frame A A A, to form a guide and to steady the bar C. D represents a screw working through the thread-box K at the top of A A A. Said screw is securely attached to the binding-bar C by turning the end of the screw down to form a shoulder to rest against the bar C, and allowing the reduced portion to pass through a beveled hole in said bar, and upsetting the end so as to hold it, at the same time allowing the screw to turn freely in the aperture, as shown in section of same D C. By means of this screw the binding-bar C is raised or lowered, as desired. The lower part of the frame A A A and movable bar C are of sufficient length to reach the full length of the prescriptions, holding them securely in an even and uniform package. E indicates an opening in said bar C, permitting the passage of the rod B. H represents a short strip of metal, securely fastened or riveted to the bar C at the lower side thereof, about two inches from the upright of A A A, to serve as a guide in the filing of prescriptions. The hole in the frame (indicated by F) is for convenience in hanging the file on a nail or fastening same with a screw.

Fig. 2 represents the invention filled with prescriptions.

When in use, the movable bar C is raised by means of the screw D above the point of the rod B and allowed to remain in that position until the file is full. To file a prescription, the prescription is passed along the lower side of the bar C until the end of the prescription touches the guide H, then pressed down upon the pointed rod B and filed.

The invention, when in use, will ordinarily be kept standing on the prescription-counter, and when filled can be placed on shelves in the same position. The hole F is simply shown as a convenient method of hanging or fastening the device against a wall or counter should it be desired so to do. The invention is equally convenient whether hung up or left sitting on the desk or counter. The guide H, being affixed a sufficient distance (about two inches) from the upright of A A A, permits the turning of one or more of the prescriptions filed to either right or left, as hereinafter indicated. When the file is filled with the requisite number, as desired, the movable bar C is screwed down firmly on the prescriptions, thus holding them securely in place. When any prescription on the file is required to be read, the movable bar is elevated slightly, the prescription of the number desired selected and turned to the left or right, the prescriptions above the one selected turned in the opposite direction, thus exposing the writing. For convenience of reference, the numbers of the prescriptions on the file when filled and the period of time embraced can be pasted on slips on the back of the upright of the frame A A A.

The object of this invention is to furnish a simple, economical, and permanent file for preserving prescriptions. It possesses many advantages over the methods heretofore in use in this, that a prescription once filed need never be removed, thus saving much time. The frame holds the prescriptions in good shape, while the small space required for the preservation of the prescriptions is an important improvement upon the methods in common use of pasting them in blank books, stringing them on twine, or tying them up in packages, &c. The prescriptions being constantly kept on the file, and not removed therefrom, loss of or damage to any of them is rendered almost impossible. As soon as the file is filled to the requisite number, by turning the screw the prescriptions are securely fastened and permanently bound until wanted for reference, when, by loosening the movable bar, any prescription can be easily found and read for purposes of renewal or other uses. For convenience of reference, the files can be made to hold five hundred or one thousand prescriptions, or other desirable number. A not unimportant advantage is the ease with which the prescriptions are handled and the security from accidental tearing or mutilation.

Having thus described my invention, what I claim as new, and desire to secure by Letters Patent, is—

In a permanent prescription-file, the movable bar C (provided with the guide H on the under side thereof) as a binder, in combination with the screw D and the frame A A A, provided with the needle B, substantially as shown and described.

ROBERT H. T. NESBITT.

Witnesses:
C. F. W. DASSLER,
J. H. FIELD.